Dec. 9, 1969 J. P. NOLTA ET AL 3,483,447

THIN FILM FERROELECTRIC DEVICE

Original Filed Sept. 26, 1963

INVENTORS
James P. Nolta &
Norman W. Schubring
BY R. J. Wallace
ATTORNEY

United States Patent Office 3,483,447

Patented Dec. 9, 1969

3,483,447

THIN FILM FERROELECTRIC DEVICE

James P. Nolta, Warren, and Norman W. Schubring, Troy, Mich., assignors to General Motors Corporation, Detroit, Mich., a corporation of Delaware Original application Sept. 26, 1963, Ser. No. 311,878, now Patent No. 3,405,440, dated Oct. 15, 1968. Divided and this application Mar. 20, 1968, Ser. No. 714,740

Int. Cl. H01l 3/00; H01g 9/00, 1/00

U.S. Cl. 317—237 3 Claims

ABSTRACT OF THE DISCLOSURE

A ferroelectric device involving a thin film of Phase III potassium nitrate sandwiched between electrical contacts. The film has a thickness of less than 0.02 inch and has its ferroelectric axis at right angles to the major surface of the film. The device is preferably enclosed in a housing providing a water vapor partial pressure of less than about 0.8 millimeter of mercury and the preferred film thickness is less than about 0.010 inch.

Figure 1:
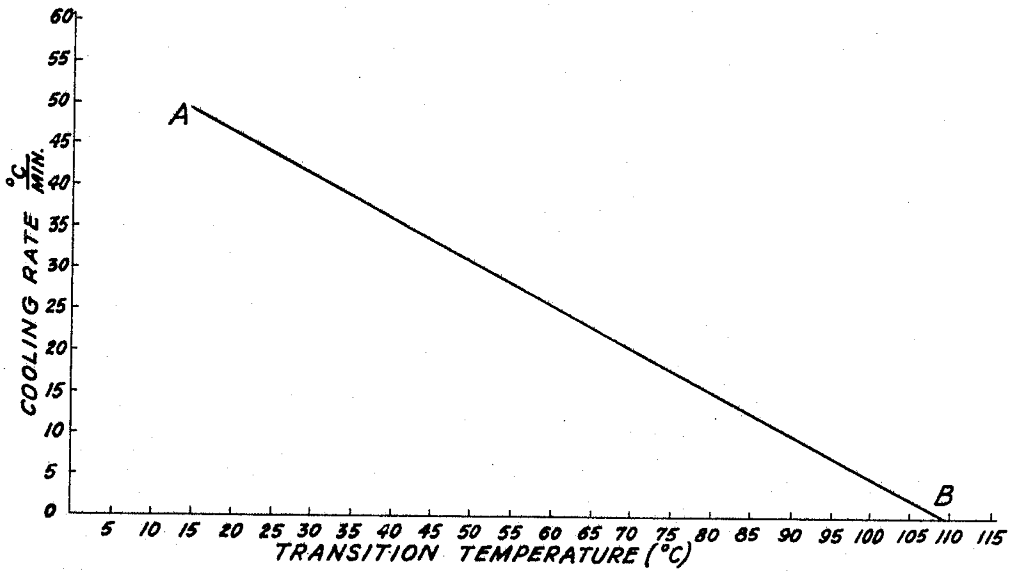

This patent application is a division of our copending United States patent application Ser. No. 311,878 Nolta et al., entitled "Ferroelectric Material and Method of Making It," which was filed Sept. 26, 1963 and is now Patent No. 3,405,440.

This invention relates to ferroelectrics. More particularly, this invention relates to a ferroelectric material, electrical devices involving this material and methods of making such materials and devices.

It is known that certain dielectrics are not linearly polarizable by applied electric fields but, when subjected to an alternating electric field, exhibit a hysteresis loop. Such a dielectric is called a ferroelectric material. One material which is known to exhibit ferroelectric properties is potassium nitrate. While it has been appreciated that potassium nitrate exhibits ferroelectric properties, heretofore these properties were only known to exist within a very limited range of elevated temperatures. Ferroelectricity is apparently peculiar to only one crystalline form of potassium nitrate. The ferroelectric crystal form is known as Phase III potassium nitrate. The Phase I crystalline form of potassium nitrate exists at all temperatures between approximately 128° C.–135° C. and the melting point of potassium nitrate. On cooling Phase I potassium nitrate at normal pressure to a temperature somewhat below 130° C., it transforms into the ferroelectric crystal structure identified as Phase III potassium nitrate. As cooling is continued, the Phase III potassium nitrate transforms into another crystal structure, Phase II potassium nitrate. Phase II potassium nitrate is that crystal form which is normally stable at room temperature and pressure conditions. In fact, evidence indicates that Phase II potassium nitrate is stable at temperatures even lower than 0° C. On reheating the Phase II crystal form, it is transformed directly into Phase I, without an intermediate change into the ferroelectric Phase III.

Various conflicting phase transformation temperatures have been reported. However, in all cases, the Phase I to Phase III transformation occurs on cooling at a temperature of approximately 120° C.–130° C., generally above 125° C. Ferroelectric Phase III is always reported as converted to Phase II before cooling below a temperature of approximately 100° C. To repeat the cycle, Phase II is heated to a temperature of about 128° C.–135° C. to reform the Phase I potassium nitrate. Hence, Phase III is formed on cooling Phase I, Phase II on cooling Phase III and Phase I on heating Phase II. Phase III is presently only known to be formed by cooling Phase I potassium nitrate. Heretofore, the only manner in which Phase III was known to be obtained at room temperature was by cooling Phase III from its normally stable temperature while it is under a pressure of approximately 3,000 atmospheres and then holding it under that pressure to stabilize it. Under the normal pressure of one atmosphere only Phase II potassium nitrate was heretofore known to be stable at room temperature.

However, we have now found that the ferroelectric Phase III potassium nitrate can be obtained under normal pressures at a much lower temperature than heretofore known to form a superior ferroelectric than any heretofore known. The resulting material apparently has a true coercivity. We have found that the Phase III to Phase II transition can be depressed to any selected temperature, even down to 0° C. By this discovery, we have been able to produce Phase III potassium nitrate at room temperature and pressure. Moreover, the method we have found is noncomplex, easy to perform, rapid and economical. Hence, it can be quite useful in the production of ferroelectric materials for piezoids, memory devices, thermodielectric converters, transpolarizers and the like. Each of these articles is included within the scope of the phrase "ferroelectric device," as used herein.

Accordingly, among the objects of our invention are to provide an improved ferroelectric material, to provide improved electrical devices using this ferroelectric material and to provide methods of making these materials and devices.

Figure 2:
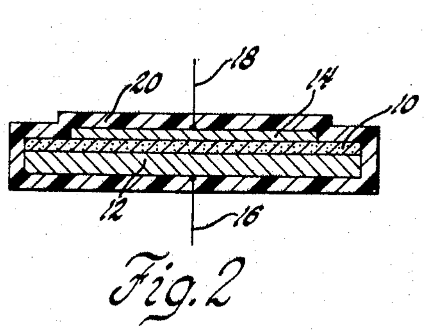

Other objects, features and advantages of the invention will become more apparent from the following description of preferred embodiments thereof and from the drawing, in which:

FIGURE 1 shows a graph which illustrates the effect of cooling rate on transition temperature between Phase III and Phase II potassium nitrate; and FIGURE 2 shows a schematic diagram of a thin film potassium nitrate electrical energy storage device formed in accordance with the invention.

Briefly, our invention contemplates depressing the Phase III to Phase II transition temperature of potassium nitrate by rapid cooling. The extent to which the transition temperature is depressed is a direct function of cooling rate. Hence, by sufficiently rapidly cooling the Phase III form, its transition temperature can be depressed below room temperature. Thus, the broader concept of the invention encompasses cooling Phase III potassium nitrate at a sufficient rate to depress its Phase III to Phase II transition temperature to a selected level, the minimum cooling rate of samples under an alternating saturating test field being defined by the line AB in FIGURE 1. Of particular interest is the cooling of a Phase III specimen at a rate in excess of about 43° C. per minute down to room temperature to obtain Phase III at room temperature.

An especially significant feature of our invention is the ease with which a ferroelectric device can be formed. In addition to the discovery of the effect of cooling rate on the Phase III to Phase II transition temperature, we have also discovered an extremely useful characteristic which this material exhibits. When thin films of polycrystalline potassium nitrate are treated in accordance with the invention, the major surfaces of the film are on the ferroelectric axis. Therefore, a ferroelectric device can be formed merely by placing some potassium nitrate on a flat metal surface, fusing the potassium nitrate, cooling the fused potassium nitrate at a rate of about 50° C. per minute down to room temperature and, then, painting a conductive silver paint on the surface of the film.

Electrical leads respectively attached to the metal plate and the conductive paint permit use of the device in the usual manner ferroelectric devices are employed.

The cooling rate employed, of course, governs the extent to which the Phase III to Phase II transition temperature is depressed. Reference is now made to FIGURE 1. This graph shows the Phase III to Phase II transition temperature, the temperature at which ferroelectricity disappears, when a specimen of potassium nitrate is cooled at a constant rate under a saturating alternating test field in a 25% relative humidity from the Phase I state, at a temperature in excess of about 135° C., at any of the rates shown. Thus, it can be seen that to attain Phase III potassium nitrate at room temperature a cooling rate in excess of about 43° C. per minute down to room temperature must be employed. However, we generally prefer to use a faster cooling rate, at least about 50° C. per minute, down to at least room temperature to attain longer life at room temperature. We always prefer to cool from a Phase I state since it is the most practical and convenient way of insuring a uniformity of result. On the other hand, one can start the rapid cool from the Phase III state also. However, minor differences in transition temperature suppression may result from differences in Phase III quench starting temperature. Similarly, differences can result due to variations in the test field, including its presence or absence. Thus, to attain a high degree of consistency in result, corresponding care should be taken in maintaining consistent quench conditions. Since we have not noticed that differences in the Phase I quench starting temperature induce any differences in result, for simplicity we always prefer to quench from the Phase I state. Thus, this minimum quench rate is somewhat variable, depending on the quench conditions. Ferroelectricity was observed at room temperatures in thin film samples quenched without a test field applied at about 5° C. per minute with sample and ambient substantially devoid of moisture. Hence, shifts in the curve shown in FIGURE 1 are contemplated due to changes in quench conditions.

Also of interest is that, in general, it appears the higher the cooling rate and the lower the final quench temperature, the longer the life of the Phase III potassium nitrate. Of course, the final quench temperature must not be lower than that transition temperature established by the quench rate used. However, the rate of cooling should not be so rapid as to induce deleterious thermal stresses within the sample. Thus, the maximum rate of cooling we prefer to use is a function of several factors when the sample is a film, including the thickness of the film and the relative differences in thermal expansion characteristics between the film and its supporting substrate. For example, film thicknesses in excess of about 0.010 inch tend to be objectionably affected by cooling rates in excess of about 50° C. per minute. However, thinner films, particularly those of smaller surface area, can be quenched at correspondingly higher rates. We, therefore, prefer to use film thicknesses less than about 0.005 inch, generally about 0.001 inch, to safely obtain the longer life attributable to the faster cooling rates. With films of this thickness on a substrate, such as copper, we prefer to use a cooling rate of about 40° C.–45° C. per minute.

It may be preferred to quench below the intended desired specimen use temperature, i.e., room temperature. In such instance, however, a sufficiently fast cooling rate should be used to depress the transition temperature below the final quench temperature. In other words, the final quench temperature should be within the limit established by the cooling rate used.

It is possible to obtain our invention without any control of the ambient, except temperature. However, moisture control of the potassium nitrate ambient is undoubtedly desirable before, during and after the potassium nitrate is made ferroelectric. While moisture does not influence depression of the transition temperature, it has a direct influence on life of the ferroelectric properties of the specimen. Hence, moisture control is necessary to preserve, not obtain, the ferroelectric properties induced by a particular quench procedure used. Moisture initially in potassium nitrate, before it is used in our invention, can be as detrimental as that picked up from the ambient while, or even after, our method is practiced.

In a very humid environment life of the Phase III potassium nitrate produced by our invention can be drastically reduced. As an example, potassium nitrate was dried at a pressure of about 10 microns of mercury and about 130° C. for several days. It was fused in air on a flat 0.06 inch thick copper plate to give a film of about 0.001 inch in thickness. A conductive silver paint electrode was then painted onto the surface of the film. The assembly was cooled in air at a rate of about 50° C. per minute, as measured by the surface temperature of the copper plate. The relative humidity of the air was about 30% to 40%. The ferroelectric properties of the film had degenerated considerably in less than about one-half hour. On the other hand, a device was similarly formed with potassium nitrate that was previously dried in the same way. However, it was formed in an atmosphere having a water vapor partial pressure no greater than about 1 millimeter of mercury. The life of this device did not appear to be appreciably reduced. To insure best results, we prefer to start with dry potassium nitrate and use an environment, both in forming and maintaining the formed device which has a water vapor partial pressure less than about 0.8 millimeter of mercury. Of course, it is to be understood that encapsulation of our device is a practical means of maintaining the desired environment, as is potting the device in a suitable plastic composition, or the like.

While the invention has been described in connection with thin films of potassium nitrate, it is also applicable to layers of potassium nitrate much thicker than about 0.02 inch. However, much greater care must be taken when rapidly cooling layers of potassium nitrate having a minimum cross-sectional dimension above about 0.02 inch. In general, as thickness is increased, the rate of cooling must be reduced to avoid objectionable thermal effects. Moreover, an extremely important ancillary benefit of the invention, from a commercial standpoint, is not inherently achievable when forming thick potassium nitrate specimens. This ancillary benefit resides in the inherent favorable orientation of the Phase III crystal form when potassium nitrate is fused to form a thin film. The two major surfaces of the film are on the ferroelectric axis of the Phase III potassium nitrate that results on cooling by our method. Inherently, then, one obtains the benefit of being able to form extremely thin highly useful specimens of ferroelectric material, in situ, merely by quenching as we describe. Consequently, the tedious and costly task of crystal growing, slicing, dicing, etc., is completely eliminated. Analogously, it is not necessary to apply any electric field during the forming process at any time. This favorable orientation is not inherent in large mass formations. We have found that in film thicknesses below approximately 0.02 inch, crystal orientation of the anisotropic ferroelectric Phase III is precisely that which is desired for application of contacts to the two major surfaces of the film. This favorable orientation was also found to be inherent in such thin films of sodium nitrate, which are ferroelectric at room temperature.

While we have described that the thin layers of potassium nitrate can be formed by fusing granular potassium nitrate, other methods of forming thin films can also be used. For example, a thin layer of elemental potassium can be applied to a surface and then treated with nitric acid to form potassium nitrate, in situ. This can be conveniently accomplished by exposing the potassium to nitric acid fumes or to a nitric acid solution to form a thin layer of potassium nitrate. In addition, a thin layer of potassium nitrate can be precipitated by vapor deposition or from aqueous solution. Other physical methods of forming thin layers of potassium nitrate include spraying from a molten state or as dissolved in a suitable solvent. In the last-mentioned methods, an aqueous solution of potassium nitrate can be sprayed onto a heated copper substrate so as to leave a thin deposit of potassium nitrate. These methods too, in essence, precipitate a thin layer of potassium nitrate on a substrate.

FIGURE 2 illustrates an electrical energy storage device formed in accordance with the invention. A thin film 10 of potassium nitrate, less than about 0.02 inch, is deposited on a copper plate 12. The copper plate not only serves as a contact on one surface of the potassium nitrate film 10 but also as a support for it. A coating 14 of silver paint serves as a contact on the opposite surface of the film 10. Electrical leads 16 and 18 are secured to the contacts 12 and 14, respectively. A coating 20 of lacquer, enamel or the like seals the assembly from ambient moisture.

Of course, the film need not be formed on a substrate which is to function as an electrode. It can be formed on another surface and then removed. Use of differential solubility between substrate and the potassium nitrate is one manner of separating a potassium nitrate film from its substrate.

Moreover, it has been found that the material produced by our method exhibits a hysteresis loop which is considerably better than that previously obtainable with any Phase III potassium nitrate heretofore formed. The material produced by our invention exhibits an apparent true coercivity. It is, therefore, useful as a standard for comparison and evaluation of other materials. Squareness ratios, the ratio of maximum to minimum slope on the hysteresis loop, in excess of 800:1 can be consistently obtained with thin film devices formed as simply as previously described. Our material has a low spontaneous polarization, about 5 microcoulombs per square centimeter. Moreover, our material exhibits extremely rapid switching action with apparently the same order of energy required for switching as with an equal volume of the best barium titanate ferroelectric materials currently available. However, our invention allows use of much thinner ferroelectric material cross sections than is possible with barium titanate. Hence, we can form devices that require only about one-fifth the energy needed to switch a barium titanate device.

The particular nature of electrodes which which are applied to the potassium nitrate film are not of significance to operability of the invention. However, as would be expected, the nature of the contacts used may affect the results obtained to some extent, particularly with thin film devices. In general, any of the normal and accepted practices of applying contacts to ferroelectric materials can be used, particularly those which provide good broad area contact. Painted-on contacts, as previously indicated, evaporated contacts, sputtered contacts and the like, are preferred for most applications, especially for thin film devices. However, spring biased electrodes in intimate contact with the surfaces of the film may be used in some instances. The relative thermal expansions of the contact material and the potassium nitrate can become of significance, as previously indicated. While this is not generally of appreciable significance to operability of a device, it may be desirable to closely match these coefficients of expansion in some instances. Copper is preferred as a substrate-contact material for forming broad area devices. Other substrate materials which have been used are graphite, steel, conductive glass and nickel.

It is to be understood that other variations of the articles and processes described can be made without departing from the spirit of the invention. Accordingly, there is no intention to be limited by this description except as defined by the appended claims.

We claim:

1. A ferroelectric device comprising a thin film of potassium nitrate of a thickness within an order of 0.02 inch and ferroelectric at room temperature and one atmosphere, and electrical contacts on opposite major surfaces of said film.

2. A unit for storing electrical energy, said unit comprising a thin film of Phase III potassium nitrate ferroelectric at room temperature and one atmosphere pressure, the thickness of said film being less than about 0.02 inch, electrical contacts on opposite major surfaces of said film, and an enclosure for said unit providing an ambient having a water vapor partial pressure less than about 0.8 millimeter of mercury.

3. A ferroelectric device comprising a film of Phase III potassium nitrate ferroelectric at room temperature and one atmosphere pressure and having a thickness less than 0.010 inch and electrical contacts on opposite major surfaces of said film, wherein one of said contacts is copper.

References Cited

UNITED STATES PATENTS

| | | | |
|---|---|---|---|
| 2,857,532 | 10/1958 | Ziegler | 317—262 |
| 2,972,570 | 2/1961 | Haas et al. | 317—258 |
| 3,213,027 | 10/1965 | Fatuzzo et al. | 252—62.9 |
| 3,256,481 | 6/1966 | Pulvari | 317—262 |

OTHER REFERENCES

Ferroelectric Crystals, a book by Franco Jana and G. Shirane, The Macmillan Co., New York.

JAMES D. KALLAM, Primary Examiner

U.S. Cl. X.R.

317—258, 230